United States Patent [19]
Hrubesh et al.

[11] Patent Number: 6,005,012
[45] Date of Patent: Dec. 21, 1999

[54] METHOD FOR PRODUCING HYDROPHOBIC AEROGELS

[75] Inventors: Lawrence W. Hrubesh, Pleasanton; John F. Poco; Paul R. Coronado, both of Livermore, all of Calif.

[73] Assignee: The Regents of the University of California, Oakland, Calif.

[21] Appl. No.: 09/182,408

[22] Filed: Oct. 29, 1998

[51] Int. Cl.$^6$ ........................................ C08J 9/36
[52] U.S. Cl. ................ 521/53; 106/287.12; 106/187.16; 423/335; 521/57; 521/86; 521/93; 521/181
[58] Field of Search ................... 521/53, 93, 57, 521/86, 181; 106/287.12, 287.16; 423/335

[56] References Cited

U.S. PATENT DOCUMENTS

| | | | |
|---|---|---|---|
| 3,873,337 | 3/1975 | Läufer et al. | 106/308 Q |
| 4,873,218 | 10/1989 | Pekala | 502/418 |
| 4,997,804 | 3/1991 | Pekala | 502/418 |
| 5,086,085 | 2/1992 | Pekala | 521/187 |
| 5,275,796 | 1/1994 | Tillotson et al. | 423/338 |
| 5,409,683 | 4/1995 | Tillotson et al. | 423/338 |
| 5,476,878 | 12/1995 | Pekala | 521/61 |

OTHER PUBLICATIONS

D. M. Smith et al, "Aerogel Synthesis Using Extractive Drying," Mat. Res. Soc. Symp. Proc. vol. 431, pp 291–297, (1996). H. Yokogawa and.
M. Yokoyama, "Hydrophobic silica aerogels," Journal of Non–Crystalline Solids, 186, pp 23–29, (1995).
Kun–Hong Lee et al, "Low–density, hydrophobic aerogels," Journal of Non–Crystalline Solids, 186, pp 18–22, (1995).
G. Reichenauer et al, "Characterization of $SiO_2$, RF and carbon aerogels by dynamic gas expansion," Journal of Non–Crystalline Solids, 186, pp 334–341, (1995).
R. W. Pekala et al, "Carbon Aerogels: An Update on Structure, Properties, and Applications," *Sol–Gel Processing and Applications,* Edited by Y. A. Attia, Plenum Press, New York, pp 369–377, (1994).
C. Stumpf et al, "Dynamic gas flow measurements on aerogels," Journal of Non–Crystalline Solids, 145, pp 180–184, (1992).
C. Jeffrey Brinker and George W. Scherer, *Sol–Gel Science The Physics and Chemistry of Sol–Gel Processing,* Academic Press, New York, pp 515–531, pp 536–541, pp 608–613, (1990).
J. Zarzycki and T. Woignier, "Aerogels: Precursors or End Materials," Aerogels: Proceedings of the First International Symposium, edited by J. Fricke, Springer Proceedings in Physics, vol. 6, Springer–Verlag, Heidelberg, Germany, pp. 42–48, (1986).

*Primary Examiner*—Morton Foelak
*Attorney, Agent, or Firm*—Alan H. Thompson

[57] ABSTRACT

A method for treating a dried monolithic aerogel containing non-dispersed particles, with an organometallic surface modifying agent to produce hydrophobic aerogels. The dried, porous hydrophobic aerogels contain a protective layer of alkyl groups, such as methyl groups, on the modified surfaces of the pores of the aerogel. The alkyl groups at the aerogel surface typically contain at least one carbon-metal bond per group.

20 Claims, 2 Drawing Sheets

METHOD FOR PRODUCING HYDROPHOBIC AEROGELS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to the surface modification of dry monolithic aerogels.

2. Description of Related Art

Monolithic aerogels are a special class of open-cell porous materials derived from the supercritical drying of cross-linked inorganic or organic gels. By today's standards, typical aerogels are porous materials in which all structural entities (i.e., pores, particles) are smaller than 5000 Å. Such materials have ultrafine pore sizes of less than 5000 Å, continuous porosity, high surface areas of typically 400–1000 $m^2/g$, and a microstructure composed of interconnected colloidal-like particles or polymer chains with typical characteristic diameters of less than 500 Å. This microstructure is responsible for the exceptional optical, acoustic, thermal, and mechanical properties of such aerogels. In most instances, it is essential to obtain such dried gels in a monolithic state, i.e., free of cracks.

Silica aerogels are the most extensively described aerogel materials in the scientific and patent literature. Aerogels of transition metal oxides, in particular, are not as well described, and these aerogels are expected to possess some properties that are not possible with silica aerogels due to the presence of the transition metal. The new characteristics of the aerogels will produce interesting new materials for optical, magnetic, and catalytic applications.

The first aerogels were translucent pieces of porous silica glass made by S. S. Kistler (U.S. Pat. No. 2,249,767). Kistler's aerogels are prepared by forming silica hydrogels, which are exchanged with alcohol and dried. The alcohol is supercritically extracted in the drying process, and the resulting aerogel has a density of about 0.05 $g/cm^3$. Kistler's process is time-consuming and laborious, and subsequent advances in the art have reduced the processing time and increased the quality and porosities of aerogels.

Other related art discusses the production of metal oxide aerogels other than silica aerogels. Teichner et al., in *Advances in Colloid and Interface Science* 5:245–273 (1976), provides a general discussion of metal oxide aerogels, including oxides of silicon, aluminum, titanium, zirconium, magnesium, nickel, copper, and molybdenum. Lynch (U.S. Pat. No. 3,977,993) discusses a modified Kistler method for making metal oxide aerogels. These aerogels are made by preparing a hydrogel, exchanging the water in the gel with an organic solvent, and then supercritically extracting the organic solvent. The Lynch patent does not discuss the peculiar problems in using different metals and the process conditions necessary to ensure that the resulting aerogels form large, transparent, intact (monolithic) solids.

European Patent No. 0382310 by Enichem discusses a process for preparing monoliths of metal oxide aerogels. The process comprises an acidic hydrolysis of a metal alkoxide, the gelation of the resulting colloidal solution, and the supercritical drying of the gel. The patent recognizes the difficulty in obtaining monolithic aerogels with metals other than silicon. The patent addresses the problem by adding a powder of a metal oxide to the colloidal solution at the end of hydrolysis, before gelation.

Aside from metal oxide aerogels, organic aerogels result from the reactions of certain organic compounds, for example (1) resorcinol with formaldehyde (known as RF aerogel), (2) melamine with formaldehyde (known as MF aerogel) and (3) phenolic-furfural with propanol. Such aerogels can be prepared in monolithic form and have been employed in double layer capacitors.

Many applications of aerogels require exposure to water or atmospheric moisture. Normally aerogel materials have a large affinity to absorb liquids such as water due to their high porosity with pores open to the surface. However, present aerogels are prepared either hydrophilic (i.e., absorb liquid water) or are only temporarily hydrophobic (i.e., shed liquid water). Methods are needed to either initially prepare hydrophobic aerogels, or treat the dried and/or fully prepared aerogels to achieve permanent hydrophobicity at ambient conditions as well as over a range of temperature and pressure conditions.

As early as the 1970's, fluidized beds of highly dispersed oxide and mixed oxide particles have been treated with various organic silicon compounds and controlled amounts of steam to produce products having hydrophobic properties. See, for instance, U.S. Pat. No. 3,873,337, where Laufer et. al. describe the fluidized bed treatment of highly dispersed, relatively low surface area (130 $m^2/g$), low porosity oxides with gaseous dialkyldichlorosilane and water in an atmosphere of $CO_2$. However, such treatments do not consider the problems encountered to hydrophobize the present day relatively thick, highly porous, high surface area, monolithic aerogels that are essentially free of dispersed particles.

Even the modification of hydrophilic surfaces of such monolithic, low density aerogels with methanol vapor by Lee et al., "Low-density, hydrophobic aerogels," *Journal of Non-Crystalline Solids*, vol. 186 (1995), has produced hydrophobic aerogels for a relatively short period. The very high porosity of such dried aerogels, especially pores on open surfaces having an unusually high affinity to water, contributes to the problem of preparing permanently hydrophobic aerogels. Since many of the present-day applications of the subject aerogels require a wide variety of atmospheric exposures, the search continues to produce a monolithic, transparent and thick aerogel having permanent hydrophobicity at ambient conditions, yet still retain such properties over a wide range of temperature and pressure conditions.

SUMMARY OF THE INVENTION

Dried monolithic, translucent or transparent aerogels essentially free of dispersed particles are prepared in thicknesses of greater than about 1 millimeter (mm) and treated with a surface modifying agent to produce molecular species chemically bonded throughout the monolithic aerogel surfaces. Such molecular species uniformly cover the highly porous, high surface area aerogel surfaces so that the hydrophobicity throughout the aerogel is improved. A typical surface modifying agent contains at least one organohalogen compound, usually having at least one alkyl group and at least one halogen atom linked to a metal atom (and some metalloid atoms).

In a preferred embodiment, permanently hydrophobic, relatively thick-dimensioned silica aerogels that are essentially free of dispersed particulates are prepared by initially removing all organic molecules from the dried aerogel and ensuring that the porous aerogel surfaces are covered primarily by silanol groups. Such prepared, dried aerogels having relatively high surface areas and relatively small, uniform pore sizes are contacted with vapors of a surface modifying agent containing trimethlychlorosilane (TMCS) that are caused to diffuse through the thick-dimensioned monoliths to react with the surface silanol groups to form —Si—O—Si— bonds and a protective "umbrella" of methyl groups linked to the silica surface.

DETAILED DESCRIPTION OF THE INVENTION

Figure 1:
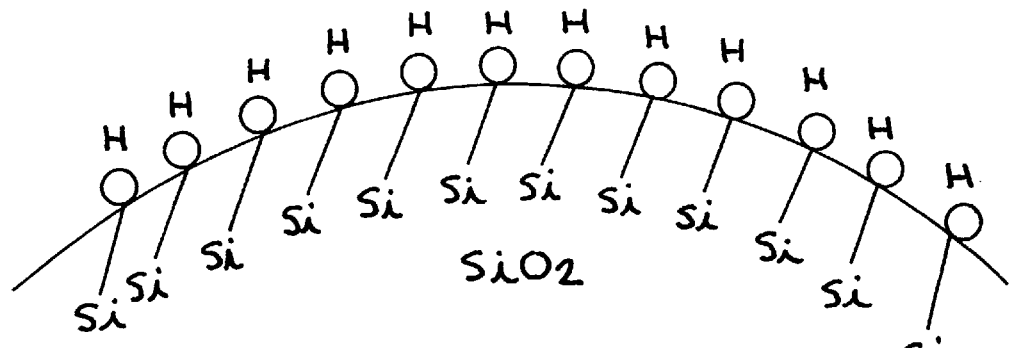

The invention relates to a method for producing monolithic, transparent aerogels (metal oxide and organic) having hydrophobic properties. In the case of metal oxide aerogels, preparation includes a controlled hydrolysis of a metal alkoxide dissolved in an organic solvent with water and a catalyst. An alcogel of metal oxide is formed, usually in a container or mold in which the gel structure comprises a hydroxylated, alkoxylated metal oxide, and the alcogel pores are filled with the organic solvent. The organic solvent is supercritically extracted from the alcogel to form the dried metal oxide aerogel. Preferably, the alcogel is maintained in the container or mold while the organic solvent is supercritically extracted. Before the drying step, the organic solvent in the alcogel may be partially exchanged with another organic solvent, or with an inorganic extraction fluid, such as liquid $CO_2$. The dried metal oxide aerogels may be heated in an oxygen atmosphere (sintering) to improve transparency and mechanical strength. Examples of preparations of metal oxide aerogels and product aerogels useful in the present invention can be found in U.S. Pat. Nos. 5,275,756, and 5,409,683, issued to Tillotson et al., the disclosures of which are incorporated by reference herein in their entireties.

In the case of the preparation of organic aerogels, melamine or a phenolic substance such as resorcinol are combined with formaldehyde in the presence of at least one catalyst. Organic aerogels are also formed from a mixture of phenolic novolak resin dissolved in furfural and the phenolic-furfural further dissolved in a propanol. The gels so formed can be exchanged into an organic solvent and supercritically dried with $CO_2$. The latter resultant aerogel can be further carbonized. Examples of preparations of organic and carbon aerogels can be found in U.S. Pat. Nos. 4,873,218, 4,997,804, 5,086,085, and 5,476,878, issued to Pekala, the disclosures of which are incorporated by reference herein in their entireties.

Control over the formulation and drying steps of the aerogels treated by the invention allows for the production of transparent, monolithic metal oxide and organic aerogels having variable properties including densities, surface areas, porosities, surface wettabilities, and the like. The pore sizes of the dried aerogels prior to treatment by the method of the invention are of diameter less than 5000 Å, and usually less than 500 Å. The aerogel solids may include at least 90% of the total pore volume in pores of diameter from about 200 Å to about 500 Å. The surface area of the aerogels is normally at least 200 $m^2/g$, preferably at least 300 $m^2/g$, and more preferably at least 400 $m^2/g$, calculated by the B.E.T. method. It is highly preferred that such surface areas of the pre-treated aerogels be above about 800 $m^2/g$. The densities of the dried aerogels made using such methods typically range from 1–700 $mg/cm^3$. The pore volume of the dried aerogels typically range from about 1 $cm^3/g$ to about 100 $cm^3/g$, calculated by nitrogen adsorption.

Such properties provide a porous aerogel structure having a sufficient strength to support at least 1000 times its own weight. For example, aerogels treated by the invention having densities from about 20 $mg/cm^3$ to about 300 $mg/cm^3$, which have porosities from about 98% to about 85%, respectively, are able to support at least 1000 times, and often at least 2000 times their own weight.

Figure 2:
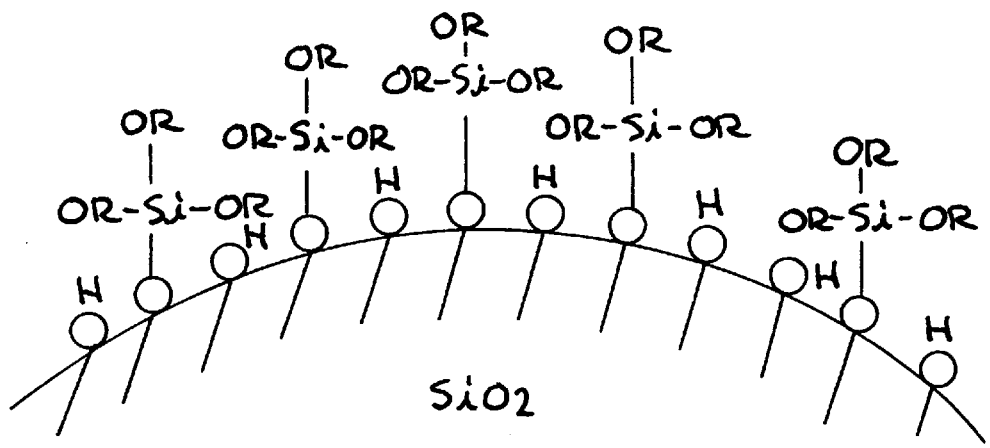

A typical inorganic oxide that is supercritically dried with $CO_2$, and/or heat treated, has hydroxyl (OH) surface groups, as shown in FIG. 1. Such OH surface groups cause the dried aerogel surface to be highly interactive with water, i.e., is readily wettable by liquid water—the aerogels are hydrophillic. FIG. 2 shows that when such aerogels are supercritically dried with or exposed to organics, such as for example, alcohol vapors, several of the OH surface groups will be converted to alkoxy (OR) surface groups that cause the dried aerogel surface to be at least temporarily hydrophobic in a water-containing environment, still susceptible to being wettable by liquid water.

Figure 3:
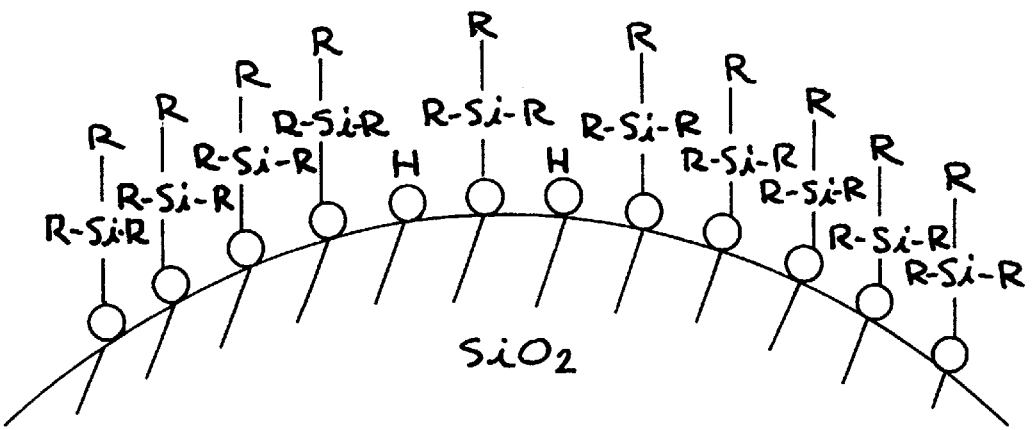

Imparting enhanced hydrophobicity to dried metal-oxide aerogels, such as silica, requires modifying the molecular nature of the internal surfaces, particularly by forming a surface bond of metal-to-carbon. The OH surface groups (such as silanol for the silica) are hydrophilic because relatively low surface energy allows liquid water to wet them (hydrophillic). When the aerogels are dried by solvent exchange at low temperature supercritical extraction, many silanol groups are retained on the surface as shown in FIG. 1 as metal-to-oxygen-hydrogen; hence the aerogels are hydrophilic (wet by liquid water). Organic molecules, on the other hand, give the aerogel surfaces a relatively higher energy, which tends to repel liquid water (hydrophobic). If aerogels are dried at high temperature under supercritical fluid extraction of the organics as in FIG. 2, the conditions allow some organics to replace the OHs on the metal bonds through esterification, so these materials have some degree of hydrophobicity. However, in this case, the organics are linked to the inorganic metals by metal-oxygen-carbon surface bonds (shown in FIG. 2 as silicon-oxygen-R for alkyl group), which are weak bonds that can easily be broken again upon exposure to atmospheric moisture (water), thus reforming the hydrophilic OH groups. Stronger, more stable bonds exist directly between metal and carbon as compared to the above-mentioned surface bonds. The metal-carbon bonds are preferred in order to obtain a more permanent hydrophobic nature to the overall aerogel surface. Such a surface bond structure is shown in FIG. 3 which is obtained by the method of the invention by reacting certain types of organo-metallic molecules to the dried aerogels. Oxygen-to-metal-to-carbon surface bonds (OMRs), such as the oxygen-silicon-carbon surface bonds shown in FIG. 3 (carbon from the R alkyl group), covering a majority, and preferably most of, or essentially the entire aerogel surface, effects hydrophobic properties of a permanent nature to the aerogel. In other words, by the method of the invention a resultant permanently hydrophobic aerogel is produced having a surface containing a substantial proportion of chemically bound organometallic species from said organometallic halogen composition, particularly surfaces having surface alkyl groups bound to metals (such as silicon) which are in turn bound to oxygen. A substantial proportion of such surface species encompasses that amount sufficient to impart the permanently hydrophobic properties to the aerogel.

The inventive method can also be applied to any organic aerogels that have surface hydroxyl groups after drying, such as, for example, the heretofore mentioned phenolic-based aerogels. In such a case, the organo-metallic chemicals used to react with the inorganic metal hydroxyls (OHs)

also react with the organic hydroxyls (ROHs) of the organic aerogels to form stable, hydrophobic surface groups (R—OSiC) containing the same strong surface (Si—C) bonds as in the metal oxide case; however, in the case with the organic aerogels, the weaker R- [or C]-to-O-to-Si-to-C bonds are covered and protected from further reactions with water.

The method parameters of temperature, pressure, rate of heating, and pressure release are important in preparing the final dried, hydrophobic aerogel and in controlling the aerogel's final properties. Initially, the surfaces of the aerogel are thermally treated at a temperature from about 50 degrees C. to about 300 degrees C. to produce a pre-dried aerogel that is subsequently reacted with a gaseous surface modifying agent comprising an organometallic halogen composition to produce a resultant organometallic aerogel. The pre-dried aerogel is contacted with the vapor of a surface modifying agent under ambient and preferably elevated pressure conditions, such as 1 to about 500 atmospheres (i.e., in a pressurization vessel), to effect diffusion of the agent throughout the interior and exterior surfaces of the aerogel pores and further cause reaction with the aerogel to form (1) a surface layer on the resultant organometallic aerogel that contains at least one alkyl (preferably methyl) group chemically bonded to an oxygen atom located at the aerogel surface as well as (2) a halogen-containing by-product composition such as a hydrogen-halogen composition (i.e., HCl, HBr, HI). The byproduct may be removed by diffusion, evacuation, or by purging. The layer can contain metal-oxygen-metal-bonds such as -silicon-oxygen-silicon-bonds and chemically bound organic species (such as alkyl groups). The resultant aerogel surface is essentially completely covered with at least one of such layers. Any potential deleterious effects caused by the escaping acidic by-product composition on the aerogel surfaces can be alleviated by including neutralizing components (deacidifying compositions such as $CO_2$) within the enclosed pressurization vessel. The resultant aerogel is permanently hydrophobic under normal atmospheric conditions, and the hydrophobic nature is retained by the aerogel even at high pressures, e.g., from above about 1 to about 500 atmospheres, and at high temperatures, e.g., from above about 25 to about 250 degrees C. The final aerogels are heat resistant and not susceptible to heat-induced loss of hydrophobicity, particularly below temperatures of about 250° C.

The method typically has three steps. In the first step, for metal oxide aerogels, essentially all organic molecules are removed from the internal surfaces by heating the aerogel in air or oxygen above about 250 degrees C. for at least 1 hour. In the second step, the resultant pre-dried aerogel is exposed to conditions that ensure hydroxyl groups cover the internal surfaces of the aerogel. The third step involves diffusing the gaseous surface modifying agent throughout the interior and exterior pores of the aerogel. The surface modifying agent preferably containing at least two alkyl groups and at least one halogen atom linked to a metal atom, reacts with the aerogel to produce the resultant organometallic aerogel. The vapor molecules of the surface modifying agent penetrate the pores of the aerogel so as to react with the hydroxyl groups to form relatively strong metal-oxide bonds to the aerogel and the volatile acid which is removed from the highly porous aerogel.

The surface modifying agent comprises an organometallic halogen composition, including an agent containing at least two alkyl groups and at least one halogen atom linked to a metal atom. The metal atom is normally selected from the group including titanium, zirconium, tantalum, germanium, boron, strontium, iron, praseodymium, erbium, cerium, lithium, magnesium, aluminum, phosphorus, and preferably silicon. The halogen atom normally includes bromine or iodine, but preferably chlorine. The alkyl group is usually selected from the group consisting of methyl, ethyl, propyl, butyl and pentyl, with methyl and ethyl being preferred, and methyl most preferred. Examples of surface modifying agents effective for use in the invention include trimethylchlorosilane, trimethylbromosilane, dimethylethylchlorosilane, dimethylpropylchlorosilane, dimethyldichlorosilane, trichloromethylsilane, dimethylethylbromosilane, trichloroethylsilane, trichloropropylsilane, triethylchlorosilane, tripropylchlorosilane, tributylchlorosilane, dimethylethylbromosilane, dimethylpropylbromosilane, dimethylbutylchlorosilane, dimethylbutylbromosilane, dichloromethylsilane, dichloroethylysilane, dichloropropylsilane, dichlorobutylsilane, dibromomethylsilane, dibromoethylsilane, dibromopropylsilane and dibromobutylsilane. A highly preferred surface modifying agent contains at least three alkyl group and a halogen atom linked to a metal atom, as for example, trimethylchlorosilane.

Figure 4:
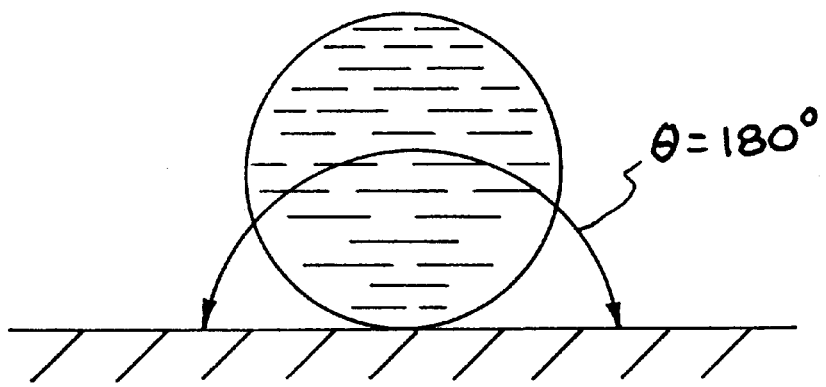
Figure 5:
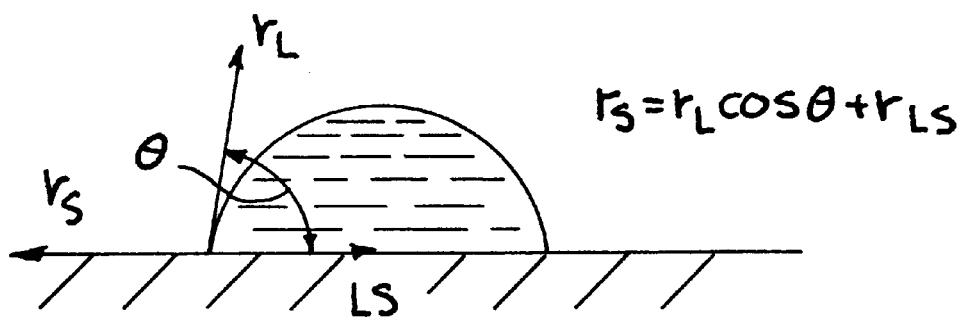
Figure 6:
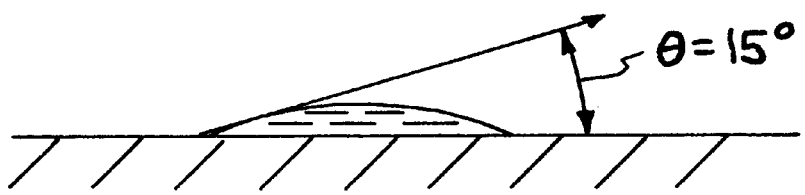

The final dried aerogels of the invention are permanently hydrophobic. Permanently hydrophobic aerogels, as used herein, are antagonistic to water and incapable of fracturing in water for extended time periods of at least sixty days. Hydrophobicity values for the resultant product aerogels prepared by the method of the invention range from about 90 degrees to less than 180 degrees, calculated by the Contact Angle method. A permanently hydrophobic aerogel surface has a Contact Angle hydrobicity value (herein referred to as "Contact Angle") of greater than 90 degrees maintained for at least 60 days at RTP. The Contact Angle method is a quantitative test for hydrophobicity of a solid surface wherein a contact angle is measured between the solid (aerogel) surface and the tangent to a water droplet on the surface, measured from the point of contact of the droplet with the surface. For example a 'perfectly hydrophobic' surface makes a 180 degree contact angle with a droplet, whereas the contact angle is less than 90 degrees for droplets that wet the surface. FIG. 4 illustrates the extreme case in which a solid aerogel surface exhibits essentially complete hydrophobicity wherein a water droplet contacts the solid surface at a single point, thus forming a contact angle of 180 degrees. FIG. 5 illustrates a solid aerogel surface exhibiting a moderately hydrophobic surface wherein the droplet contacts the solid surface at an intermediate contact angle denoting partially wetting. FIG. 6 illustrates an example of relatively small hydrophobicity of an aerogel surface wherein the water droplet spreads to form a thin film on the surface and the contact angle is relatively small, e.g., about 15 degrees, denoting high wettability. By the method of the invention, hydrophobic aerogels can be prepared that have a Contact Angle from about 90 to about 120 that can be maintained for more than 1 year and those that have a Contact Angle from about 120 to about 160 that can be maintained for more than 2 years (at RTP). In general, an increase in the Contact Angle of the aerogel indicates a greater length of time that hydrophobicity can be maintained.

A qualitative test of the hydrophobic nature of an aerogel material is floatation. A hydrophobic aerogel material produced by the methods described herein does not allow water to penetrate its surface. Such an aerogel therefore displaces water when put in contact with it, i.e., the aerogel will float.

A partially hydrophobic surface on a porous material can allow water to slowly penetrate the aerogel material by wetting, eventually sinking the material in the water. Thus, an aerogel material floating on water, under given test conditions (i.e., temperature, relative humidity, etc.), for a long period of time is considered to be hydrophobic, as compared to one that sinks after a lesser testing period.

A feature of the invention is that treatment involves contacting the surface modifying agent with dried monolithic, translucent or transparent aerogels which are essentially free of dispersed particles and are prepared in thicknesses of greater than about 1 millimeter. The thickness of the treatable monolithic aerogels are non-dispersed particles of cross-sectional diameter above about 1 mm, or pieces of aerogel usually greater than about 100 mm in minimum dimension. Such aerogels are of-size that is incapable of being fluidized. Although of substantial thickness, such aerogels encompass pores and particles of sizes less than the wave length of visible light. For example, a monolithic, non-opaque aerogel, having a width of greater than 5 mm, length greater than 10 mm and a thickness of greater than 2 mm, is treated by the method of the invention so as to acquire permanent hydrophobicity.

Such thick, relatively large-dimensioned aerogels have been found to surprisingly allow diffusion of the reactive surface modifying agents disclosed herein throughout the interior pore surfaces of the aerogel solid mass without plugging of the aerogel pores during either the modifying agent/aerogel surface reaction or during escape of the halogen-containing volatile by-product. Although the skilled artisan would expect reaction of the surface modifying agent with the exterior pore surfaces of the aerogel, the diffusion of the reactive agent throughout the solid mass and the resultant surface modification of the interior pore surfaces of the aerogels is surprising, particularly in such aerogels having a substantial amount of pore volume in pores of diameter less than 1000 angstroms. Diffusivities of the open pores of the aerogels obtained from dynamic gas flow measurements determined at between about 10 mbar and about 1000 mbar indicate, even at ambient temperature, that adsorption of gases could be significant such as has been disclosed by C. Stumpf et al. in the Journal of Non-Crystalline Solids, vol. 145, pp. 180–184 (1992), entitled *Dynamic gas flow measurements on aerogels*. Nevertheless, by the present invention diffusion throughout the interior pore surfaces of the aerogels by surface modifying agents disclosed herein has been effectively achieved.

The invention is further illustrated by the following examples which are illustrative of specific modes of practicing the invention and are not intended as limiting the scope of the invention as defined in the appended claims.

EXAMPLE 1

Approximately 5×5×2 cubic centimeters of a dried silica aerogel is heated to 400 degrees C. in air and then the air evacuated to produce silanol groups on atmosphere-exposed surfaces throughout the aerogel. The aerogel is cooled to ambient and sealed in a container together with a volatile liquid form of trimethylchlorosilane (TMCS). The TMCS is caused to diffuse throughout the porosity of the aerogel over a period of approximately 72 hours. HCl gas is released as a reaction product, diffused from the aerogel and evacuated from the container. The product aerogel has a Contact Angle of 124 degrees.

EXAMPLE 2

Approximately 5×5×2 cubic centimeters of a dried silica aerogel is heated to 400 degrees C. in air and then the air evacuated to produce silanol groups on atmosphere-exposed surfaces throughout the aerogel. The aerogel is cooled to ambient and sealed in a container that is connected by tubing to a reservoir containing 4 ml of trimethylchlorosilane (TMCS). Nitrogen gas is bubbled through the liquid TMCS at a rate of about 3 cc/min and the flow is directed over the aerogel in the container. The aerogel is exposed to the flow for a period of approximately 12 hours. HCl gas is released as a reaction product, diffused from the aerogel and purged from the container. The product aerogel has a Contact Angle of 132 degrees.

EXAMPLE 3

A silica aerogel, prepared in a cylinder mold having approximate dimensions of 2.5 cm diameter and 2.5 cm thick, is dried by the rapid supercritical extraction of an alcohol solvent at a temperature of about 300° C. After decompression of the mold containing the aerogel, the aerogel is evacuated to a pressure less than 1 millitorr. The aerogel, while still in the mold, is exposed to TMCS vapor for 0.5 hour, at 300° C. temperature. HCl gas is released as a reaction product, diffused from the aerogel and pumped from the mold using a vacuum pump. The product aerogel has a Contact Angle of 124.5 degrees.

EXAMPLE 4

A resorcinol-formaldehyde aerogel having approximate dimensions of 1.5×2.5×4 cubic centimeters, is heated to 100° C. in air for 4 hours. The aerogel is cooled to ambient and sealed in a container together with a volatile liquid form of trimethylchlorosilane (TMCS). The TMCS is caused to diffuse throughout the porosity of the aerogel over a period of approximately 20 hours. HCl gas is released as a reaction product, diffused from the aerogel and evacuated from the container. The product aerogel has a Contact Angle of 92 degrees.

EXAMPLE 5

A floatation test for measuring hydrophobicity includes floating a 2×2×5 cm aerogel strip on water until ⅕ of the strip thickness is submerged in the water. The floatation time and Contact Angle are measured and compared for silica aerogels having the following four types of surface molecules; 1) silanols (obtained by supercritical drying in carbon dioxide), 2) mixture of silanol and alkoxy groups (obtained by supercritical drying in alcohol), 3) mixture of silanols and water (obtained by heat treating a silica aerogel in air at 200° C. and in a vacuum at 300° C., then exposing the cooled sample to the atmosphere, i.e., RTP), and 4) alkyl groups (obtained by the method of the invention described herein in Example 2 ). The Contact Angle and floatation measurements for each of types 1 through 4 above are summarized in Table 1.

TABLE 1

Contact Angle and floatation time measurements for hydrophobic aerogels treated with TMCS

| Aerogel type | Contact Angle (degrees) | Floatation Time |
| --- | --- | --- |
| 1 | 0 | ~ 2 seconds |
| 2 | 78 | 384 hours |
| 3 | 0 | ~ 2 seconds |
| 4 | 132 | > 2000 hours |

The data indicate that an aerogel prepared by the method of the invention, i.e., alkyl groups substantially covering the aerogel surface, exhibits permanent hydrophobicity as compared to aerogels exhibiting hydrophillic properties that contain alkoxy and silanol groups.

Although particular embodiments of the present invention have been described and illustrated, such is not intended to limit the invention. Modifications and changes will no doubt become apparent to those skilled in the art, and it is intended that the invention only be limited by the scope of the appended claims.

The invention claimed is:

1. A method for increasing the hydrophobicity of a dried fully prepared non-dispersed, monolithic aerogel, said method comprising:

homogenously contacting a dried aerogel with a gaseous surface modifying agent comprising an organometallic halogen composition to produce a resultant organometallic aerogel; and removing a halogen-containing by-product composition from said resultant organometallic aerogel to produce a product aerogel.

2. The method of claim 1 wherein said dried aerogel comprises an organic aerogel or a metal oxide aerogel.

3. The method of claim 1 wherein said organometallic halogen material comprises at least one alkyl group and at least one halogen atom linked to a metal atom.

4. The method of claim 3 wherein said metal atom selected from the group consisting of titanium, zirconium, tantalum, germanium, boron, strontium, iron, praseodymium, erbium, cerium, lithium, magnesium, aluminum, phosphorus and silicon.

5. The method of claim 1 wherein said contacting comprises diffusing said gaseous surface modifying agent into said dried, monolithic aerogel having a surface area greater than 200 m²/g and an average pore diameter less than about 1000 angstroms to produce a resultant aerogel having a surface containing a substantial proportion of chemically bound organometallic species from said organometallic halogen composition.

6. The method of claim 3 wherein said halogen atom comprises chlorine, bromine or iodine said alkyl group is selected from the group consisting of methyl, ethyl, propyl, butyl and pentyl.

7. The method of claim 1 further comprising removing contaminant material from said dried aerogel prior to said contacting.

8. The method of claim 1 further comprising removing liquid from a gel prior to said contacting.

9. A method for treating a dried aerogel, said method comprising:

removing organic molecules from a dried monolithic, transparent aerogel having a surface area greater than 200 m²/g and a porosity having at least 90% of the pores of diameter less than 1000 angstroms;

contacting said dried aerogel with a surface modifying agent comprising at least two alkyl group and at least one halogen atom linked to a metal atom to produce a resultant organometallic aerogel; and removing a hydrogen-halogen by-product composition from said resultant organometallic aerogel.

10. The method of claim 9 wherein said removing of said organic molecules is effected by heating said dried aerogel and said contacting comprises diffusing said gaseous surface modifying agent throughout the interior and exterior pore surfaces of said aerogel.

11. The method of claim 9 wherein said surface modifying agent selected from the group consisting of trimethylchlorosilane, trimethylbromosilane, dimethylethylchlorosilane, dimethylpropylchlorosilane, dimethyldichlorosilane, trichloromethylsilane, dimethylethylbromosilane, trichloroethylsilane, trichloropropylsilane, triethylchlorosilane, tripropylchlorosilane, tributylchlorosilane, dimethylethylbromosilane, dimethylpropylbromosilane, dimethylbutylchlorosilane, dimethylbutylbromosilane, dichloromethylsilane, dichloroethylysilane, dichloropropylsilane, dichlorobutylsilane, dibromomethylsilane, dibromoethylsilane, dibromopropylsilane and dibromobutylsilane.

12. The method of claim 9 wherein said metal atom selected from the group consisting of titanium, zirconium, tantalum, germanium, boron, strontium, iron, praseodymium, erbium, cerium, lithium, magnesium, aluminum, phosphorus and silicon.

13. The method of claim 9 further comprising removing liquid from a gel prior to said removing of said organic molecules from said dried aerogel.

14. A method for increasing the hydrophobicity of a dried metal-oxide aerogel, said method comprising:

heating a dried aerogel in the range from 50 degrees C. to 500 degrees C. to remove organic molecules from a surface of said dried aerogel;

contacting said surface of said dried aerogel with a surface modifying agent comprising at least three alkyl group and a halogen atom linked to a metal atom under an elevated pressure from above 1 to about 500 atmospheres to produce a resultant organometallic aerogel; and removing a hydrogen-halogen composition from said resultant organometallic aerogel.

15. The method of claim 14 wherein said dried metal-oxide aerogel comprises a silanol group on said surface and said surface modifying agent comprises trimethylchlorosilane.

16. The method of claim 15 wherein said heating is in the range from about 200 degrees C. to about 600 degrees C.

17. The method of claim 15 wherein said hydrogen-halogen composition comprises hydrogen chloride and said resultant organometallic aerogel is hydrophobic after 10 hours of said contacting.

18. The method of claim 15 wherein a surface of said resultant organometallic aerogel comprises a layer of -oxygen-silicon-carbon-bonds.

19. The method of claim 15 wherein a surface of said resultant organometallic aerogel comprises a substantial proportion of -silicon-methyl group bonds.

20. A method for increasing the hydrophobicity of a dried fully prepared aerogel essentially free of dispersed particles, said method consisting essentially of:

contacting a dried, monolithic aerogel essentially free of dispersed particles with a surface modifying agent comprising an organometallic halogen composition to produce a resultant organometallic aerogel; and removing a hydrogen-halogen composition from said resultant organometallic aerogel to produce a product aerogel.

* * * * *